(12) United States Patent
Di Carlo et al.

(10) Patent No.: US 9,394,968 B2
(45) Date of Patent: Jul. 19, 2016

(54) POLY-V BELT COMPRISING A LAYER OF THERMOPLASTIC MATERIAL AND A KNITTED FABRIC EMBEDDED IN AN ELASTOMERIC LAYER

(71) Applicant: Dayco Europe S.r.l., Chieti (IT)

(72) Inventors: Arcangelo Di Carlo, Chieti (IT); Marino Petaccia, Lettomanoppello (IT); Gianluca Perfetti, Chieti (IT); Marco Di Meco, Pescara (IT)

(73) Assignee: DAYCO EUROPE S.R.L., Chieti (IT)

(*) Notice: Subject to any disclaimer, the term of this patent is extended or adjusted under 35 U.S.C. 154(b) by 0 days.

(21) Appl. No.: 14/399,223

(22) PCT Filed: May 9, 2013

(86) PCT No.: PCT/IB2013/053767
§ 371 (c)(1),
(2) Date: Nov. 6, 2014

(87) PCT Pub. No.: WO2013/168123
PCT Pub. Date: Nov. 14, 2013

(65) Prior Publication Data
US 2015/0141187 A1 May 21, 2015

(30) Foreign Application Priority Data
May 9, 2012 (IT) ................ TO2012A0419

(51) Int. Cl.
*F16G 1/00* (2006.01)
*F16G 5/00* (2006.01)
(Continued)

(52) U.S. Cl.
CPC *F16G 5/14* (2013.01); *B29D 29/10* (2013.01);
*F16G 5/20* (2013.01); *B29K 2023/0625* (2013.01); *B29K 2023/16* (2013.01)

(58) Field of Classification Search
CPC ............... F16G 5/20; F16G 1/28; F16G 5/08; Y10T 428/2457; Y10T 428/249933
USPC ........................................ 474/266, 268, 260
See application file for complete search history.

(56) References Cited

U.S. PATENT DOCUMENTS

| 3,724,284 A | 4/1973 | Eng et al. |
| 4,752,282 A | 6/1988 | Habegger |

(Continued)

FOREIGN PATENT DOCUMENTS

| EP | 0280175 | 8/1988 |
| EP | 1930622 | 6/2008 |

(Continued)

OTHER PUBLICATIONS

PCT, International Search Report and Written Opinion, International Application No. PCT/IB2013/053767 (Sep. 18, 2013).

*Primary Examiner* — Henry Liu
(74) *Attorney, Agent, or Firm* — Thompson Hine LLP

(57) ABSTRACT

Poly-V belt comprising a body made of elastomeric material, preferably EPDM, a plurality of threadlike resistant inserts longitudinally embedded in the body, and a coupling portion integrally connected to the body and comprising a plurality of V-shaped ribs arranged side by side and alternated with V-shaped grooves. According to the present invention the belt comprises a layer of a thermoplastic material which covers the ribs at least partially, and a layer of elastomeric material in which a knitted fabric is embedded. The layer of elastomeric material is above and in contact with the thermoplastic material.

15 Claims, 3 Drawing Sheets

(51) Int. Cl.
  *F16G 9/00* (2006.01)
  *F16G 1/04* (2006.01)
  *F16G 5/14* (2006.01)
  *F16G 5/20* (2006.01)
  *B29D 29/10* (2006.01)
  *B29K 23/00* (2006.01)

(56) References Cited

U.S. PATENT DOCUMENTS

| | | | |
|---|---|---|---|
| 6,443,866 B1 * | 9/2002 | Billups | F16G 1/28 474/260 |
| 7,824,284 B2 * | 11/2010 | Burlett | B29D 29/08 428/167 |
| 8,142,316 B2 * | 3/2012 | Goettsch | F16G 1/28 474/205 |
| 8,262,523 B2 * | 9/2012 | Kanzow | D04B 21/18 474/268 |
| 8,293,357 B2 * | 10/2012 | Cretin | F16G 1/10 156/138 |
| 8,507,391 B2 | 8/2013 | Schleicher et al. | |
| 8,632,650 B2 | 1/2014 | Mori et al. | |
| 2006/0234820 A1 * | 10/2006 | Yamamoto | B65G 15/34 474/266 |
| 2008/0132370 A1 * | 6/2008 | Goettsch | F16G 5/20 474/268 |
| 2008/0261739 A1 * | 10/2008 | Kanzow | D04B 21/18 474/266 |
| 2010/0075793 A1 * | 3/2010 | Cretin | F16G 1/10 474/205 |
| 2010/0167860 A1 | 7/2010 | Mori et al. | |
| 2010/0173740 A1 | 7/2010 | Mori et al. | |
| 2014/0296011 A1 * | 10/2014 | Yoshida | F16G 5/08 474/261 |
| 2014/0323256 A1 * | 10/2014 | Yoshida | B29D 29/10 474/148 |

FOREIGN PATENT DOCUMENTS

| | | |
|---|---|---|
| FR | 2210251 | 7/1974 |
| JP | 61-065937 | 4/1986 |
| WO | 2010/109321 | 9/2010 |
| WO | 2011/015945 | 2/2011 |

* cited by examiner

POLY-V BELT COMPRISING A LAYER OF THERMOPLASTIC MATERIAL AND A KNITTED FABRIC EMBEDDED IN AN ELASTOMERIC LAYER

TECHNICAL FIELD

The present invention concerns a transmission belt, particularly for driving accessories of an internal combustion engine, of the type with multiple or poly-V grooves.

PRIOR ART

An accessory transmission generally comprises a drive pulley connected to a crank shaft of an internal combustion engine of the motor vehicle, at least one second and one third pulley connected, respectively to an alternator and to an accessory, for example a hydraulic pump, and a transmission belt for connecting the pulleys to one another.

Today's engines require the transmission members and in particular the transmission belt to have an increasingly long average life even though they are required to operate in conditions of high temperature and under considerable mechanical stress.

The transmission belts for driving accessories used today are also called "poly-V" belts.

Said belts comprise a body made of elastomeric material, preferably EPDM, a plurality of threadlike resistant inserts longitudinally embedded in the body, and a coupling portion integrally connected to the body and comprising a plurality of V-shaped ribs, arranged side by side and alternated with V-shaped grooves.

In order to prolong the average life of the transmission belt by reducing its abrasion, a layer of material more resistant to abrasion is commonly used, for example a fabric, a nonwoven fabric or a thermoplastic material which covers the ribs at least partially.

Said solution, already available on the market, has not proved to be particularly effective.

In particular, whether a fabric or a continuous' layer of thermoplastic material is used as the covering material, both tend to be very stressed and "stretched" in the grooves and on the ribs during the vulcanisation phase. This means that the covering material is weakened at the very points subject to the greatest stress during use.

Furthermore the above-mentioned, covering materials entail greater friction between the contact surface of the belt and the pulley. Said greater friction, in addition to further increasing the possibilities of breakage, also increases the noise level of the belt during operation.

Numerous alternatives are also known for attempting to avoid the problems described above, for example the U.S. Pat. No. 3,724,284A shows the use of a knitted fabric on the ribs of a poly-V belt. The drawback of said solution is that during vulcanisation, the elastomeric material penetrates into the fabric. In particular, in the case of a knitted fabric, the fabric penetrates directly into the body mix and therefore does not allow significant improvement in abrasion.

The patent EP280175 shows the use of a barrier layer or a shock absorbing layer between the rubber body and the fabric; in this patent said barrier layer has an elastomeric base.

The patent FR2210251 illustrates the use of layers of thermoplastic material on the surface of the ribs of poly-V belts.

None of these solutions, however, simultaneously solves all the problems described above and in particular the search continues for a transmission belt able to withstand the abrasion, therefore having a sufficiently long life, and simultaneously ensure a low noise level.

SUMMARY OF THE INVENTION

The purpose of the present invention is the production of a transmission belt of the type with multiple or poly-V grooves, particularly for driving accessories of an internal combustion engine, which solves the problems described above.

The above-mentioned purpose is achieved by a belt according to claim 1 and process according to claim 14.

DISCLOSURE OF THE INVENTION

Figure 1:
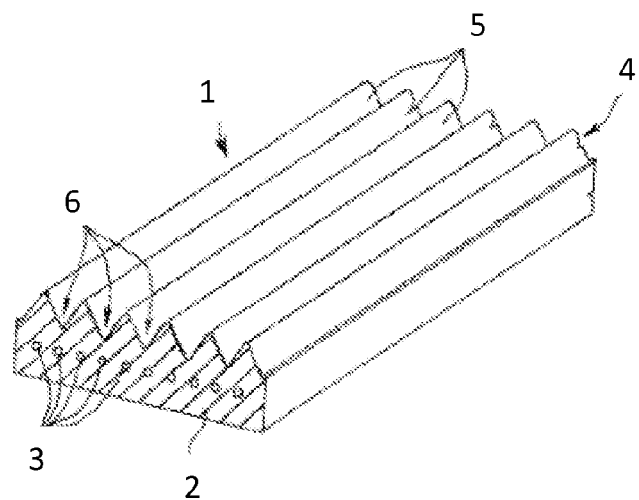
FIG. 1 is a partial schematic view of a portion of a poly-V belt with the resistant inserts highlighted.

With reference to FIG. 1, the number 1 indicates a poly-V belt comprising a body 2 comprising a first elastomeric material, a plurality of threadlike resistant inserts 3 longitudinally embedded in the body, and a coupling portion 4 integrally connected to the body and comprising a plurality of V-shaped ribs 5 arranged side by side and alternating with V-shaped grooves 6.

Figure 2:
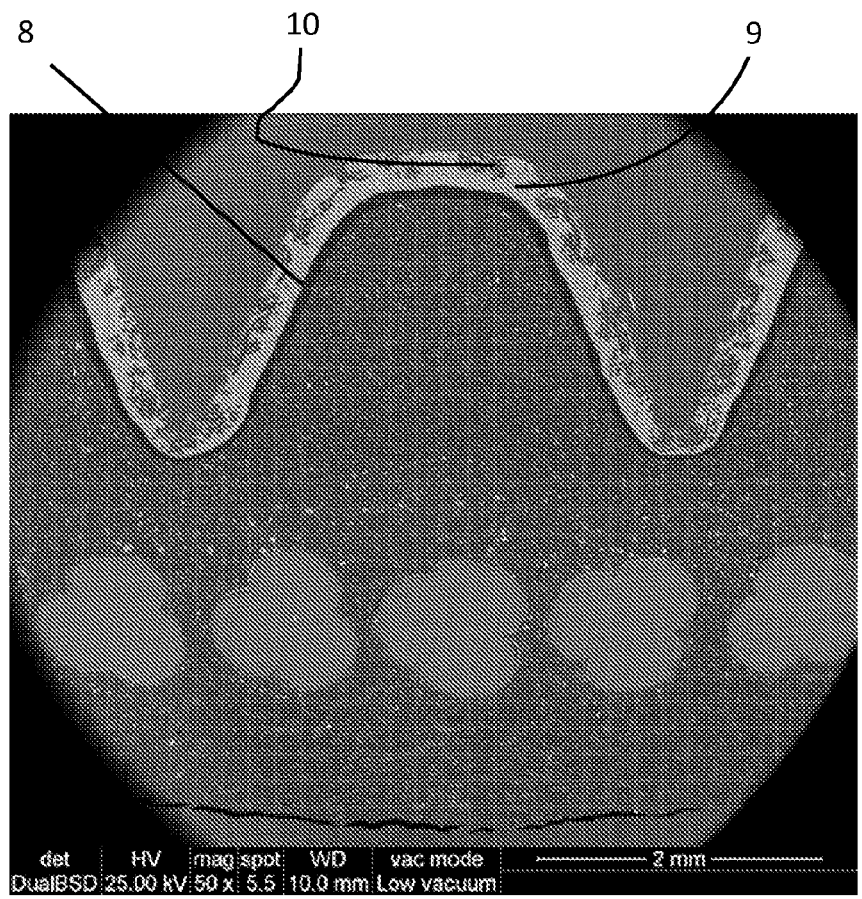
FIG. 2 is a photograph of a section of a poly-V belt according to the invention with the layers that form said belt highlighted.

According to the present invention and as illustrated in further detail in FIG. 2, the poly-V belt of the present invention furthermore comprises a layer of thermoplastic material 8 which covers at least partially the ribs. 5 and a layer comprising a second elastomeric material 9 in which a knitted fabric 10 is embedded, which is arranged externally and directly in contact with the layer of thermoplastic material, so that there is no contact between the fabric 5 and the layer of thermoplastic material.

The first elastomeric material constituting the body of the belt preferably comprises an ethylene alpha-olefin elastomer, even more preferably EPDM.

The thermoplastic material preferably comprises a polyolefin, more preferably a polythene homo or copolymer.

In particular homopolymers and copolymers based on polythene, ethylene-propylene, ethylene-butene, ethylene-pentene, ethylene-hexene, ethylene-heptene, ethylene-octene and copolymers or mixtures of the same can be used.

Even more preferably LDPE or LLDPE is used, which can be irradiated or non-irradiated.

LLDPE is furthermore preferred.

The preferred LLDPE has a density in the range between 0.900 and 0.950, more preferably between 0.915 and 0.940.

The use of an LLDPE catalysed with metallocenes, known also as m-LLDPE, which can be used alone or in a mixture with other homo or copolymers, is particularly preferred.

The thermoplastic material preferably has a thickness in the range between 15 μm and 200 μm, more preferably between 30 μm and 100 μm.

Figure 3:
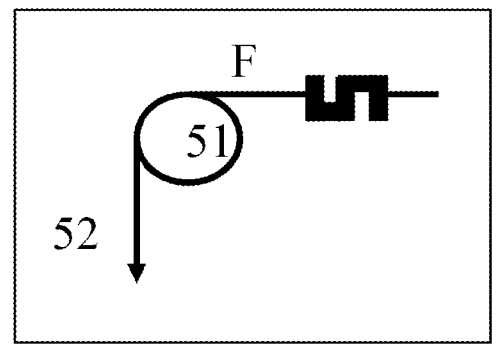
FIG. 3 is a diagram of the transmission system for measuring the friction coefficient.

As is clearly shown in FIG. 3, the thermoplastic material is in contact with the body on the one side and with the layer of elastomeric material 9 in which the fabric is embedded on the other, but it is not in direct contact with the fabric in order to avoid interpenetration between fabric and thermoplastic layer.

The elastomeric material in which the knitted fabric is embedded is preferably EPDM, but alternatively HNBR, chloroprene BR, natural rubber or SBR can also be advantageously used.

One of the advantages of the present invention is that it is possible to modulate the composition of the layer of the second elastomeric material so as to adapt it to the type of application of the poly-V belt in use.

The layer 9 of second elastomeric material has a thickness in the range between 50 and 400, more advantageously between 100 and 300, for example 200.

The fabric can be either a woven fabric or non-woven fabric or a knitted fabric.

Preferably the fabric is a knitted fabric.

The knitted fabric is particularly preferred when it has an interlock construction.

The weight of the fabric is preferably in the range between 25 and 200 g/m$^2$, more preferably between 50 and 100 g/m$^2$, for example 85 g/m$^2$.

The polymeric materials commonly used in technical fabrics can be advantageously used as materials for the fabric, for example aliphatic or aromatic polyamides, polyesters, but also fabrics with a natural base such as cotton, possibly also in complex structures or mixed with several synthetic yarns wound together.

The use of a fabric comprising yarns made of polyamide, preferably an aliphatic polyamide such as nylon 6/6, is particularly preferred.

Preferably a fabric with dtex in the range between 25 and 100 dtex, more preferably between 30 and 50 dtex, is used both in the warp and weft.

The transmission belt of the present invention is formed according to the well-known "moulding" process.

For example to produce a poly-V belt 1 according to the present invention it is possible to initially form a sleeve of elastomeric material and arrange it around a cylinder able to increase its diameter until the sleeve fully adheres to the cylinder, then apply a yarn, rotating the cylinder so as to form the resistant inserts. Subsequently a new layer of elastomeric material is applied if necessary and the sleeve is then extracted from the cylinder after reducing the diameter thereof; lastly the blank is vulcanised in a vulcanisation cylinder so as to form the ribs.

To produce the belt 1 of the present invention, a layer of thermoplastic material 8 must be applied above the layer of first elastomeric material which forms the body 2. Separately the fabric must be incorporated in a layer of a second elastomeric material and subsequently the layer of second elastomeric material containing the described knitted fabric must be applied in direct contact with the layer of thermoplastic material, which is therefore arranged above the first elastomeric material. Subsequently the vulcanisation step under pressure must be performed to mould the belt and form the ribs.

From an examination of the characteristics of the belt 1 produced according to the present invention, the advantages it offers are evident.

Using a poly-V belt according to the present invention, considerable improvements have been obtained and, in particular, the problems described above have been overcome.

In particular the thermoplastic layer 8 prevents the mix of the body penetrating into the fabric 10 and in particular into the knitted fabric during vulcanisation and formation of the ribs 5, making the fabric 10 unusable due to penetration into the body 2.

Furthermore thanks to the use of the knitted fabric 10 it is possible to obtain at low cost an elastic fabric which adapt perfectly to the profile of the ribs 5.

Furthermore thanks to the use of the layer 9 of second elastomeric material in which the knitted fabric 10 is embedded and thanks to the fact that the second elastomeric material has a friction coefficient lower than the thermoplastic material 8, it is possible to minimise the noise produced by engagement and misalignment of the belt on the pulley. In fact the noise level is very high when a thermoplastic layer or the fabric itself is present on the outer surface of the ribs.

Furthermore in the layer of elastomeric material in which the knitted fabric is embedded, it is possible to add further additives which, for example, increase its resistance to wear.

The belt 1 will be described below with reference to examples, although it is not limited to said examples.

Examples 1-3

Three different poly-V belts were formed called A, B and C all having a body made of EPDM.

The belt A has on the surface of the ribs a knitted fabric made of polyamide 6/6 yarn with interlock construction. The yarn has dtex 44 with 13 baves at one end, s twist and z twist and has a cN/tex tenacity of 47.

The belt B has on the surface of the ribs a layer of thermoplastic material consisting of LLDPE catalysed with metallocenes, known also as irradiated m-LLDPE and having density in the range between 0.915 and 0.940.

The thickness of the layer of thermoplastic material is 100 μm.

Above the layer of thermoplastic material the belt B has a knitted fabric identical to belt A.

The belt C has on the surface of the ribs a layer of thermoplastic material identical to the belt B and above this a knitted fabric chemically identical to belt A, but previously immersed in EPDM.

On the three belts described above a series of tests were performed to verify the improved behaviour of the belt C according to the invention with respect to belts A and B produced according to the known art.

The following tests were performed:
1. Friction coefficient test.
2. Pulley misalignment noise test.
3. Wear test.
1. Friction Coefficient Measurement Test.

The belts tested were poly-V belts with profile commercially known as poly v K i.e. suitable for use in vehicles, with 6 ribs and length of the belt portion for measurement of 400 mm.

Figure 4:
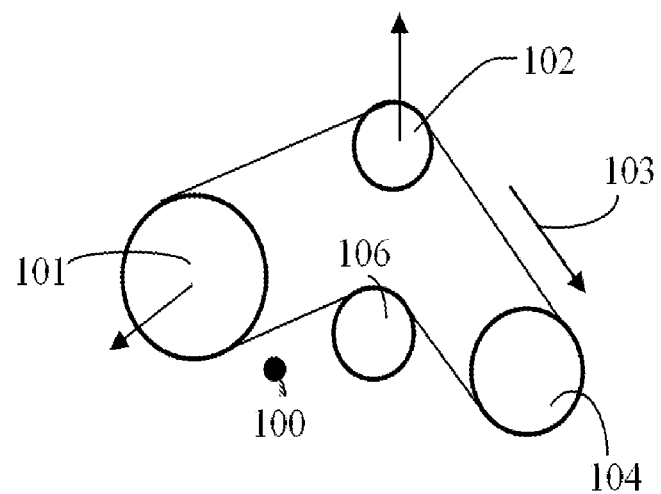
FIG. 4 is a diagram of the transmission system for the pulley misalignment noise level measurement test.

The transmission diagram for the test is shown in FIG. 4, where the number 51 indicates the drive pulley, 52 the dead load and F the friction coefficient measured.

The drive pulley is made of stainless steel and has a diameter of 61 mm. The maximum roughness Ra of the pulley is 3.2 microns.

The tests were performed under the following conditions:
Chamber temperature=27° C.
Drive pulley speed=100 RPM
Dead weight=90N (6 ribs) 70 N (with belts with 5 ribs)
The test procedure is as follows:
Fit the belt in the clamp.
Load the dead weight.
Then start the equipment or rig at 10 rpm and run for 20 min.

Check the temperature on the back of the belt (>35° C.)
Lastly begin to record F, the friction coefficient.

The results of the friction coefficient test are calculated with the following formulas:

$$COF=(Ln(F/\text{Dead weight})\times sen\, b/2)/\theta$$

With:
COF=friction coefficient
CoF*=global friction coefficient=COF/(senb/2)=Ln(F/DeadLoad)/θ
b=angle of the ribs=40°
θ=winding angle=90°

2. Pulley Misalignment Noise Test

Belts with PVK profile with 6 ribs with effective length of 1200 mm were used for this test.

FIG. 4 shows the transmission system for measuring the pulley misalignment noise level.

The figure shows the various elements with the following numbers:
100 microphone
101 driven pulley
102 dead weight tensioner
103 belt operation direction
104 drive pulley
105 idler The characteristics of the various pulleys of the transmission system are given below:

The drive pulley 104 has a diameter of 71.0 mm and is made of stainless steel.

The tensioner 102 has a diameter of 61.0 mm and is made of stainless steel.

The driven pulley P/S has a diameter of 156.0 mm and is made of stainless steel.

The idler has a diameter of 65.0 mm and is made of stainless steel.

The test specifications are the following:
Chamber temperature=27° C.
Relative humidity=60%
Misalignment: 0÷4.0 degrees with variations of 0.25°, degree increases at the driven pulley.
The drive pulley speed is 3000 RPM.
Driven pulley force: none.
Belt tension=300 N (50 N/rib).
Test Procedure:
Position the pulley misalignment at 0°.
Start the apparatus at 3000 rpm and run for 30 seconds.
Check the temperature on the back of the belt (<=35° C.).
Perform the test for all the misalignments and combinations of speed (10 sec each variation).
The test failure criterion is noise level above 86 db.

3. Rib Wear Test

A poly-V belt with PVK profile and 6 ribs is used as in the previous tests with effective length of 1000-1200 mm.

Figure 5:
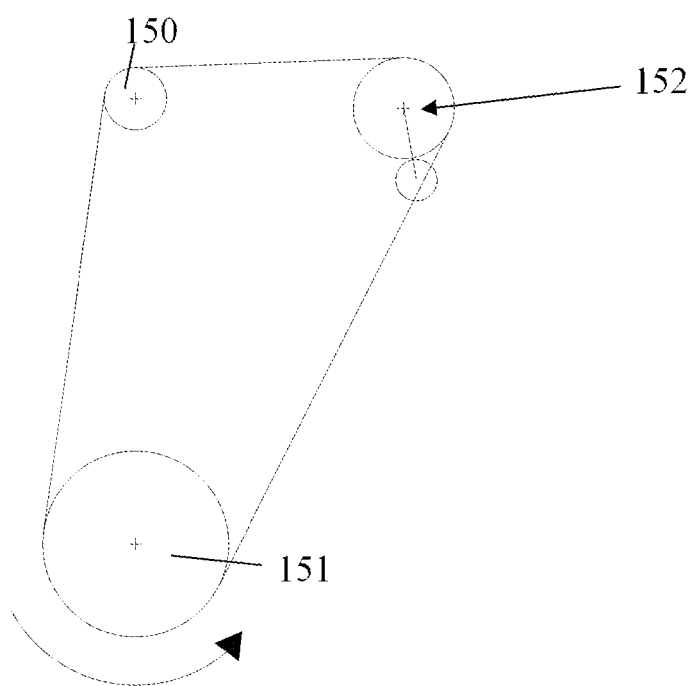
FIG. 5 is a diagram of the transmission system for the wear measurement test.

The transmission system used for the test is shown in FIG. 5, where 150 indicates the driven pulley, 151 the drive pulley and 152 the tensioner.

The characteristics of the pulleys are given below. The tension of the automatic tensioner is set to 300 N.

The drive pulley has a diameter of 120 mm.

The tensioner has a diameter of 60 mm and a pre-set tension of 300 N.

The driven pulley has a diameter of 40 mm.

The specifications for the test are the following:
Chamber temperature 25° C.
Drive pulley speed=1300 rpm
Drive pulley irregularity=2.5 deg II order (two oscillations per pulley revolution)
Driven pulley torque=3 Nm The test procedure is as follows:
Weigh the belt and install it on the system.
Measure the system to set the torsional vibration.
Perform the test for 24 hours.
If necessary measure the misalignment noise level.
Stop the test and record the weight loss.
Test failure criterion The test is interrupted when the belt has lost 10% of its weight or a rib breaks.

Test Results:

The three tests described above were performed on the three belts A, B and C previously described and the results are listed in Table 1.

TABLE 1

| Belt | 1. Friction test | 2. Noise test (test failure °) | 3. Wear test (weight loss % after 24 hours) |
|---|---|---|---|
| A | 0.3 | 3 | 2.00 |
| B | 0.22 | 3.5 | 2.00 |
| C | 0.17 | 4 | 1.00 |

It is clear from the analysis of the table that the belt according to the present invention provides better results than the comparison belts in terms of both lower noise level and lower wear and friction.

In particular a lower friction coefficient is recorded which is an indication of lower noise level and lower wear; furthermore breakage of the tooth and therefore failure of the noise test occurs only with a misalignment of 4° and lastly a lower weight loss is recorded compared to the belts in the known art.

The invention claimed is:

1. A poly-V belt (1) comprising a body (2) comprising a first elastomeric material, a plurality of threadlike resistant inserts (3) longitudinally embedded in the body, and a coupling portion (4) integrally connected to the body (2) and comprising a plurality of V-shaped ribs (5) arranged side by side and alternated to V-shaped grooves (6), said belt comprising:
a layer of thermoplastic material (8) which at least partially covers said ribs (5) and a layer comprising a second elastomeric material (9) in which a fabric is immersed (10), said layer of second elastomeric material being directly in contact with said layer of thermoplastic material (8);
wherein said second elastomeric material is present between the fabric and the first layer of thermoplastic material, thereby preventing contact between the fabric and the thermoplastic material.

2. The belt (1) according to claim 1, characterised in that said fabric is selected from the group consisting of woven fabric, knitted fabric and non-woven fabric.

3. The belt (1) according to claim 1, characterised in that said first elastomeric material is an ethylene alpha-olefin elastomer.

4. The belt (1) according to claim 3, characterised in that said ethylene alpha-olefin elastomer is EPDM.

5. A belt (1) according to claim 1, characterized in that said thermoplastic material comprises a polyolefin.

6. A belt (1) according to claim 1, characterised in that said thermoplastic material comprises a polyethylene homo or copolymer.

7. The belt (1) according to claim 6, characterised in that said polyethylene is selected from the group consisting of LDPE, LLDPE, UHMWDPE or mixtures thereof.

8. The belt (1) according to claim 6, characterised in that said thermoplastic material has a thickness in the range between 30 μm and 200 μm.

9. The belt (1) according to claim 1, characterised in that said second elastomeric material is an ethylene alpha-olefin elastomer.

10. The belt (1) according to claim 9, characterised in that said second elastomeric material is EPDM.

11. The belt (1) according to claim 1, characterized in that said layer of second elastomeric material (9) has a thickness in the range between 100 and 300 μm.

12. The belt (1) according to claim 1, characterised in that said knitted fabric has an interlock configuration.

13. The belt (1) according to claim 1, characterised in that said knitted fabric has a weight in the range between 50 and 100 g/m².

14. A process for producing a transmission belt according to claim 1 comprising the steps of:
 applying said layer of thermoplastic material on a surface of elastomeric material before a vulcanising step;
 applying a layer of elastomeric material containing said knitted fabric in direct contact with said layer of thermoplastic material; and
 vulcanising under pressure to mould said belt.

15. A poly-V belt comprising:
 a body comprising a first elastomeric material, a plurality of threadlike resistant inserts longitudinally embedded in the body, and a coupling portion integrally connected to the body, the coupling portion comprising a plurality of V-shaped ribs arranged side by side and alternated to V-shaped grooves; and
 a first layer of thermoplastic material, which at least partially covers said plurality of V-shaped ribs; and
 a second layer comprising a second elastomeric material in which a fabric is immersed, said layer of second elastomeric material being directly in contact with said first layer of thermoplastic material;
 wherein said second elastomeric material is present as an outermost surface of said plurality of V-shaped ribs;
 wherein said second elastomeric material is present between the fabric and the first layer of thermoplastic material, thereby preventing contact between the fabric and the thermoplastic material.

\* \* \* \* \*